No. 730,636. PATENTED JUNE 9, 1903.
J. F. GREEN.
HOE.
APPLICATION FILED APR. 9, 1903.
NO MODEL.
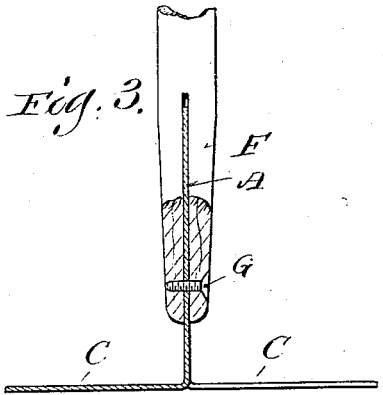
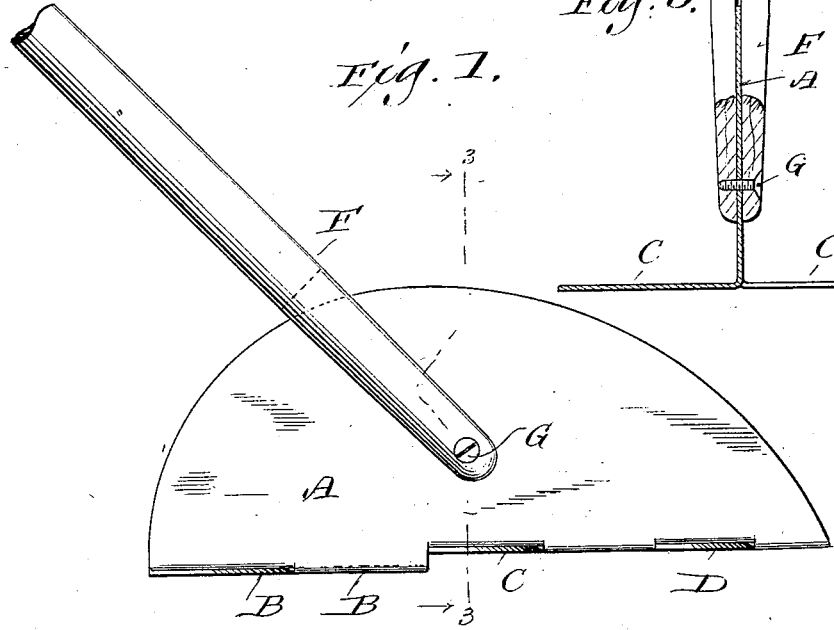
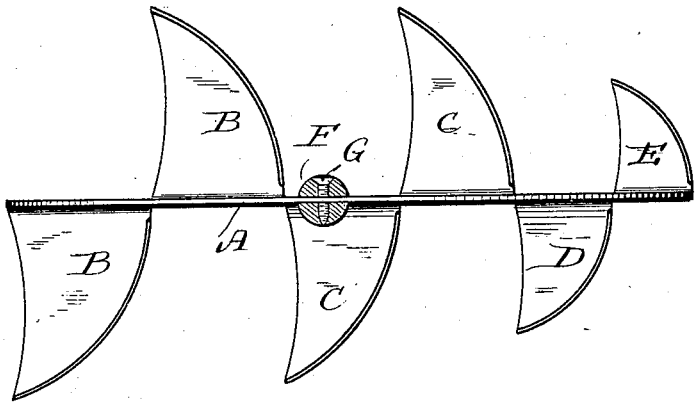
Witnesses:
Geo. W. Young
N. E. Oliphant
Inventor
James F. Green
By H. G. Underwood
Attorneys No. 730,636. Patented June 9, 1903.

UNITED STATES PATENT OFFICE.

JAMES F. GREEN, OF IVESGROVE, WISCONSIN.

HOE.

SPECIFICATION forming part of Letters Patent No. 730,636, dated June 9, 1903.

Application filed April 9, 1903. Serial No. 151,707. (No model.)

*To all whom it may concern:*

Be it known that I, JAMES F. GREEN, a citizen of the United States, and a resident of Ivesgrove, in the county of Racine and State of Wisconsin, have invented certain new and useful Improvements in Hoes; and I do hereby declare that the following is a full, clear, and exact description thereof.

My invention has for its object to provide simple economical hoes especially designed for fine gardening; and it consists in what is hereinafter particularly set forth with reference to the accompanying drawings and subsequently claimed.

Figure 1 of the drawings represents a side elevation of a hoe-blade made in accordance with my invention and provided with a pivotally-adjustable handle; Fig. 2, a plan view of the blade with the handle in horizontal section; and Fig. 3, a vertical transverse section view of said blade and handle, this view being indicated by lines 3 3 in the first figure.

Referring by letter to the drawings, the hoe-blade is shown as comprising a curved back fin A and horizontal wings extending in opposite directions from the lower portion of the fin at right angles thereto. The wings on one side alternate with those on the other side of the fin, and the hoe-blade as a whole is preferably made from a single suitably-cut and bent piece of sheet-steel.

The two oppositely-extending wings B of the hoe-blade are both approximately the same in shape and area, but on a lower plane than that of all the other wings of said blade. The two oppositely-extending wings C of the hoe-blade are approximately the same in shape and area less than that of the lower rear wings B, and oppositely-extending wings D E, though being of a shape similar to the wings aforesaid, are of different areas less than that of the wings C, the forward wing E being the one of least area. The forward edges of all the hoe-blade wings are convex and preferably beveled, the rear edges being preferably concave, although they may be straight, and whether concave or straight it may be found desirable to have them beveled. The several wings cut one ahead of another, as the hoe-blade is reciprocated, by means of a handle F, that is preferably in pivotally-adjustable connection with the fin portion of said blade astraddle of the same, the pivot being a screw G, by which said handle is clamped in its adjusted position. The best results are obtained by imparting a slight rocking motion to the hoe.

All the wings of the hoe-handle are shaped to have shearing cut outward from the fin of said blade at least in a forward direction, and while the wings C D E serve to stir and pulverize the earth the wings B act to subsoil. All the wings of the hoe-blade are destructive to weeds, and said blade can be worked close up to the plants under cultivation.

Having thus described my invention, what I claim as new, and desire to secure by Letters Patent, is—

1. A hoe having a blade comprising a vertical fin and horizontal forwardly-convex wings of increasing area toward the rear extending alternately in opposite directions from the lower portion of the fin, the rear wings being of the greatest area on a plane below that of all the other wings.

2. A hoe having a blade comprising a vertical fin and horizontal forwardly-convex and rearwardly-concave wings of increasing area toward the rear extending alternately in opposite directions from the lower portion of the fin, the rear wings being of the greatest area on a plane below that of all the other wings.

3. A hoe-blade comprising a vertical curved-back fin and horizontal forwardly-convex wings of increasing area toward the rear extending alternately in opposite directions from the lower portion of the fin, the rear wings being of the greatest area on a plane below that of all the other wings; and a handle in pivotally-adjustable connection with said fin astraddle of the same.

In testimony that I claim the foregoing I have hereunto set my hand, at Ivesgrove, in the county of Racine and State of Wisconsin, in the presence of two witnesses.

JAMES F. GREEN.

Witnesses:
   C. R. CARPENTER,
   JOHN H. HAPP.